United States Patent
Udaka et al.

(10) Patent No.: US 9,428,160 B2
(45) Date of Patent: Aug. 30, 2016

(54) BRAKE CONTROL APPARATUS

(75) Inventors: Satoshi Udaka, Suntou-gun (JP); Koji Yotsuya, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/374,436

(22) PCT Filed: Mar. 22, 2012

(86) PCT No.: PCT/JP2012/057380
§ 371 (c)(1),
(2), (4) Date: Jul. 24, 2014

(87) PCT Pub. No.: WO2013/140584
PCT Pub. Date: Sep. 26, 2013

(65) Prior Publication Data
US 2014/0336896 A1 Nov. 13, 2014

(51) Int. Cl.
*B60T 7/22* (2006.01)
*B60W 50/16* (2012.01)
*B60W 30/02* (2012.01)
*B60T 8/32* (2006.01)

(52) U.S. Cl.
CPC .............. *B60T 7/22* (2013.01); *B60T 8/3275* (2013.01); *B60T 2201/022* (2013.01); *B60T 2201/03* (2013.01)

(58) Field of Classification Search
CPC ........ B60T 7/22; B60T 7/12; B60T 8/17557; B60W 50/16; B60W 30/02; B60W 30/08; B60R 21/013
USPC .................... 701/1, 36, 45, 70, 301; 280/735
See application file for complete search history.

(56) References Cited

U.S. PATENT DOCUMENTS

| | | | |
|---|---|---|---|
| 6,275,772 B1* | 8/2001 | Sugimoto | B60T 7/22 180/169 |
| 6,473,681 B1* | 10/2002 | Eckert | B60T 7/12 180/175 |
| 7,243,944 B2* | 7/2007 | Imai | B60R 21/013 180/274 |
| 2007/0032914 A1* | 2/2007 | Kondoh | B60W 50/16 701/1 |
| 2007/0050114 A1* | 3/2007 | Koike | B60W 30/08 701/45 |
| 2008/0172153 A1* | 7/2008 | Ozaki | B60T 8/17557 701/36 |
| 2009/0143951 A1* | 6/2009 | Takahashi | B60W 30/02 701/70 |

FOREIGN PATENT DOCUMENTS

| | | |
|---|---|---|
| CN | 1907750 A | 2/2007 |
| JP | 08 295224 | 11/1996 |
| JP | 2000 118368 | 4/2000 |
| JP | 2000 142281 | 5/2000 |
| JP | 2002 512148 | 4/2002 |

OTHER PUBLICATIONS

International Search Report Issued Jun. 26, 2012 in PCT/JP12/057380 filed Mar. 22, 2012.

\* cited by examiner

*Primary Examiner* — Yuri Kan
(74) *Attorney, Agent, or Firm* — Oblon, McClelland, Maier & Neustadt, L.L.P

(57) ABSTRACT

An appropriate deceleration is achieved. A brake control apparatus is a brake control apparatus which performs a brake assist control for assisting a brake operation by a driver of a vehicle, the brake control apparatus is provided with: a calculating device which calculates a contact possibility of the vehicle contacting the obstacle; and a changing device which changes, on the basis of the contact possibility, a decreasing rate of a deceleration of the vehicle caused by the brake assist control.

15 Claims, 5 Drawing Sheets

BRAKE CONTROL APPARATUS

TECHNICAL FIELD

The present invention relates to a technical field of a brake control apparatus which performs a brake assist control for assisting a brake operation by a driver.

BACKGROUND ART

As such a brake control apparatus, for example, a brake control apparatus which performs a pre-crash brake assist control and which is one example of a pre-crash safety system is developed (for example, refer to a Patent Literature 1 and a Patent Literature 2). Such a brake control apparatus predicts a collision risk with respect to an obstacle (for example, a leading vehicle) which exists anterior to a vehicle on which this brake control apparatus is equipped. When the collision risk is relatively high, the brake control apparatus performs the pre-crash brake assist control for assisting a brake operation by a driver, in order to avoid a collision in advance.

Especially, the Patent Literature 1 discloses a brake control apparatus which increases a rising rate of a braking force more as a contact possibility with respect to the obstacle which exists anterior to the vehicle is higher. According to the brake control apparatus disclosed in the Patent Literature 1, the contact between the vehicle and the obstacle is effectively avoided, because the braking force is increased rapidly when it is difficult for the vehicle to avoid the contact with the obstacle.

Moreover, the Patent Literature 2 discloses a brake control apparatus which makes a gain which is used when a fluid pressure for the braking (a brake fluid pressure) is decreased smaller than a gain which is used when the fluid pressure for the braking is increased. According to the brake control apparatus disclosed in the Patent Literature 2, a velocity of the vehicle immediately before the stop is appropriately adjusted by delicately adjusting a returning amount of the brake, because the brake fluid pressure in returning the brake changes more slowly than the brake fluid pressure in pressing the brake changes.

CITATION LIST

Patent Literature

Patent Literature 1 Japanese Patent Application Laid Open No. 2000-118368
Patent Literature 2 Japanese Patent Application Laid Open No. H08-295224

SUMMARY OF INVENTION

Technical Problem

By the way, according to the technology disclosed in the Patent Literature 1, it is only the rising rate of the braking force (namely, an increasing rate of a deceleration of the vehicle when the deceleration increases) that is adjusted depending on the contact possibility between the vehicle and the obstacle. Namely, according to the technology disclosed in the Patent Literature 1, a falling rate of the braking force (namely, a decreasing rate of the deceleration of the vehicle when the deceleration decreases) is not adjusted. Thus, the brake assist control which achieves an enough deceleration may not be performed in some cases, and as a result, such a technical problem that an appropriate deceleration is not achieved is caused.

As the technical problem which the present invention is to solve, the above described technical problem is cited. It is an object of the present invention to provide a brake control apparatus which is capable of achieving an appropriate deceleration.

Solution to Problem (First Brake Control Apparatus)

In order to solve the above described problem, the first brake control apparatus of the present invention is a brake control apparatus which performs a brake assist control for assisting a brake operation by a driver of a vehicle when an obstacle exists anterior to the vehicle, the brake control apparatus is provided with: a calculating device which calculates a contact possibility of the vehicle contacting the obstacle; and a changing device which changes, on the basis of the contact possibility, a decreasing rate of a deceleration of the vehicle caused by the brake assist control.

According to the first brake control apparatus of the present invention, the calculating device calculates the contact possibility of the vehicle (for example, the vehicle on which the brake control apparatus is equipped, and typically own vehicle) contacting the obstacle. For example, the calculating device calculates the contact possibility of the vehicle contacting the obstacle, on the basis of a relative velocity between the vehicle and the obstacle, a relative distance between the vehicle and the obstacle and the like. Specifically, for example, the calculating device may calculate the contact possibility which indicates that a possibility of the vehicle contacting the obstacle is relatively high in the case where the relative velocity between the vehicle and the obstacle is relatively large (specifically, a velocity at which the vehicle approaches the obstacle is relatively large), compared to the case where the relative velocity between the vehicle and the obstacle is relatively small (specifically, the velocity at which the vehicle approaches the obstacle is relatively small). Alternatively, for example, the calculating device may calculate the contact possibility which indicates that the possibility of the vehicle contacting the obstacle is relatively high in the case where the relative distance between the vehicle and the obstacle is relatively small, compared to the case where the relative distance between the vehicle and the obstacle is relatively large.

The changing device changes, on the basis of the contact possibility which is calculated by the calculating device, a changing rate (especially, the decreasing rate) of the deceleration of the vehicle caused by the brake assist control.

Here, the "deceleration" means an acceleration which acts in a direction decreasing a vehicle speed of the vehicle (namely, in a direction opposite to a traveling direction of the vehicle). In the present invention, the direction decreasing the vehicle speed is defined as a positive (plus) direction of the deceleration. Moreover, the "changing rate of the deceleration" has a broad meaning which indicates a degree or a rate of a temporal change of the deceleration. Therefore, the "decreasing rate of the deceleration" indicates a rate of the decreasing of the deceleration which decreases as time passes. In the present invention, the direction decreasing the deceleration is defined as a positive (plus) direction of the decreasing rate of the deceleration.

Incidentally, typically, when the driver performs the brake operation toward a returning direction (for example, a direction along which a brake pedal is returned, and a direction decreasing a braking force), the deceleration of the vehicle decreases due to the brake assist control. Therefore, it is preferable that the changing device change the decreasing rate of the deceleration of the vehicle caused by the brake assist control when the driver performs the brake operation in the returning direction (namely, the brake assist control is performed such that the deceleration of the vehicle decreases as time passes). However, even if the driver does not perform the brake operation in the returning direction (for example, the brake operation by the driver is kept to be constant), the deceleration of the vehicle may decreases in some cases because of an influence of a master cylinder and the like. Therefore, it is preferable that the changing device change the decreasing rate of the deceleration of the vehicle caused by the brake assist control when the deceleration of the vehicle (especially, the deceleration of the vehicle caused by the brake assist control) decreases as time passes, regardless of the brake operation by the driver (in other words, regardless of a driver required acceleration described later).

As described above, according to the first brake control apparatus of the present invention, the decreasing rate of the deceleration of the vehicle caused by the brake assist control is changed on the basis of the contact possibility. Thus, the brake assist control which achieves an appropriate deceleration adapting to the contact possibility is performed.

Incidentally, as one method of changing the decreasing rate of the deceleration of the vehicle, a method of changing a decreasing rate of the braking force (especially, the braking force which is added to the vehicle when the brake assist control is performed such that the braking force which is added to the vehicle by the brake assist control decreases as time passes) is anticipated. Here, the smaller the braking force is, the smaller the deceleration is (namely, the larger the braking force is, the larger the deceleration is). Thus, the changing device may decrease the decreasing rate of the braking force in order to decrease the decreasing rate of the deceleration. Namely, the changing device is capable of decreasing the decreasing rate of the deceleration by decreasing the braking force in a relatively gradual manner (for example, by decreasing a brake fluid pressure in a relatively gradual manner). Similarly, the changing device may increase the decreasing rate of the braking force in order to increase the decreasing rate of the deceleration. Namely, the changing device is capable of increasing the decreasing rate of the deceleration by decreasing the braking force in a relatively rapid manner (for example, by decreasing the brake fluid pressure in a relatively rapid manner).

Incidentally, the first brake control apparatus may incorporate various aspects, in response to various aspects which a second brake control apparatus described later incorporates.

[2]

In another aspect of the first brake control apparatus of the present invention, the changing device changes, on the basis of the contact possibility, the decreasing rate of the deceleration when the brake assist control is performed such that the deceleration decreases as time passes.

According to this aspect, the changing device is capable of changing the decreasing rate of the deceleration of the vehicle caused by the brake assist control when the driver performs the brake operation in the returning direction (namely, the brake assist control is performed such that the deceleration of the vehicle decreases as time passes).

Incidentally, as described above, even if the driver does not perform the brake operation in the returning direction (for example, the brake operation by the driver is kept to be constant), the deceleration of the vehicle may decreases in some cases because of the influence of the master cylinder and the like. Therefore, it is preferable that the changing device change the decreasing rate of the deceleration of the vehicle caused by the brake assist control when the deceleration of the vehicle (especially, the deceleration of the vehicle caused by the brake assist control) decreases as time passes, regardless of the brake operation by the driver (in other words, regardless of the driver required acceleration described later).

[3]

In an another aspect of the first brake control apparatus of the present invention, the changing device changes the decreasing rate of the deceleration such that the higher the contact possibility is, the smaller the decreasing rate of the deceleration is.

According to this aspect, the brake assist control which achieves an appropriate deceleration adapting to the contact possibility is performed.

Specifically, according to this aspect, the decreasing rate of the deceleration becomes relatively small when the contact possibility is relatively high. Therefore, the deceleration of the vehicle decreases gradually when the contact possibility is relatively high. In other words, the deceleration of the vehicle has difficulty in decreasing when the contact possibility is relatively high. Namely, the vehicle speed of the vehicle decreases easily when the contact possibility is relatively high. Therefore, the vehicle can stop at a relatively earlier timing in the case where the contact possibility is relatively high, compared to the case where the contact possibility is relatively low. Alternatively, the contact possibility between the vehicle and the obstacle can be reduced or can become zero at a relatively earlier timing in the case where the contact possibility is relatively high, compared to the case where the contact possibility is relatively low. Therefore, the contact between the vehicle and the obstacle can be avoided or suppressed appropriately or surely when the contact possibility is relatively high.

On the other hand, the decreasing rate of the deceleration becomes relatively large when the contact possibility is relatively low. Therefore, the deceleration of the vehicle decreases rapidly when the contact possibility is relatively low. In other words, the deceleration of the vehicle caused by the brake assist control becomes zero at a relatively earlier timing, when the contact possibility is relatively low. In other words, an assist caused by the brake assist control ends at a relatively earlier timing, when the contact possibility is relatively low. Namely, the timing when the brake assist control ends is relatively earlier in the case where the contact possibility is relatively low, compared to the case where the contact possibility is relatively high. Therefore, there is really very litter or no case that the brake assist control is performed excessively even when the contact possibility is relatively low. Thus, a responsiveness of the driver with respect to the brake operation improves.

[4]

In an another aspect of the first brake control apparatus of the present invention, the changing device changes, on the basis of the contact possibility, an increasing rate of the deceleration when the brake assist control is performed such that the deceleration increases as time passes, the changing device (i) changes the increasing rate of the deceleration such that the higher the contact possibility is, the larger the increasing rate of the deceleration is, if the contact possibility is equal to or more than a predetermined threshold value, and (ii) fixes the increasing rate of the deceleration, if the contact possibility is not equal to or more than the predetermined threshold value.

According to this aspect, the changing device can change the increasing rate of the deceleration of the vehicle, in addition to the decreasing rate of the deceleration of the vehicle. Here, the "increasing rate of the deceleration" indicates a rate of the increasing of the deceleration which increases as time passes. In the present invention, the direction increasing the deceleration is defined as a positive (plus) direction of the increasing rate of the deceleration.

Incidentally, typically, when the driver performs the brake operation toward a pressing direction (for example, a direction along which a brake pedal is pressed, and a direction increasing the braking force), the deceleration of the vehicle increases due to the brake assist control. Therefore, it is preferable that the changing device change the increasing rate of the deceleration of the vehicle caused by the brake assist control when the driver performs the brake operation in the pressing direction (namely, the brake assist control is performed such that the deceleration of the vehicle increases as time passes). However, even if the driver does not perform the brake operation in the pressing direction (for example, the brake operation by the driver is kept to be constant), the deceleration of the vehicle may increases in some cases because of the influence of the master cylinder and the like. Therefore, it is preferable that the changing device change the increasing rate of the deceleration of the vehicle caused by the brake assist control when the deceleration of the vehicle (especially, the deceleration of the vehicle caused by the brake assist control) increases as time passes, regardless of the brake operation by the driver (in other words, regardless of a driver required acceleration described later).

In this case, as one method of changing the increasing rate of the deceleration of the vehicle, a method of changing an increasing rate of the braking force (especially, the braking force which is added to the vehicle when the brake assist control is performed such that the braking force which is added to the vehicle by the brake assist control decreases as time passes) is anticipated. Here, the smaller the braking force is, the smaller the deceleration is (namely, the larger the braking force is, the larger the deceleration is). Thus, the changing device may decrease the increasing rate of the braking force in order to decrease the increasing rate of the deceleration. Namely, the changing device is capable of decreasing the increasing rate of the deceleration by increasing the braking force in a relatively gradual manner (for example, by increasing a brake fluid pressure in a relatively gradual manner). Similarly, the changing device may increase the increasing rate of the braking force in order to increase the increasing rate of the deceleration. Namely, the changing device is capable of increasing the increasing rate of the deceleration by increasing the braking force in a relatively rapid manner (for example, by increasing the brake fluid pressure in a relatively rapid manner).

Especially in this aspect, the changing device changes the increasing rate of the deceleration such that the higher the contact possibility is, the larger the increasing rate of the deceleration is, if the contact possibility is equal to or more than a predetermined threshold value. On the other hand, the changing device fixes the increasing rate of the deceleration, if the contact possibility is not equal to or more than the predetermined threshold value. Thus, the brake assist control which achieves an appropriate deceleration adapting to the contact possibility is performed.

Specifically, the case where the contact possibility is equal to or more than the predetermined threshold value is firstly explained.

The increasing rate of the deceleration becomes relatively large, when the contact possibility is equal to or more than the predetermined threshold value and is relatively large, Therefore, the deceleration of the vehicle increases rapidly when the contact possibility is equal to or more than the predetermined threshold value and is relatively large. Namely, the vehicle speed of the vehicle decreases easily when the contact possibility is equal to or more than the predetermined threshold value and is relatively large. Therefore, the vehicle can stop at a relatively earlier timing in the case where the contact possibility is equal to or more than the predetermined threshold value and is relatively large, compared to the case where the contact possibility is equal to or more than the predetermined threshold value and is relatively small. Alternatively, the contact possibility between the vehicle and the obstacle can be reduced or can become zero at a relatively earlier timing in the case where the contact possibility is equal to or more than the predetermined threshold value and is relatively large, compared to the case where the contact possibility is equal to or more than the predetermined threshold value and is relatively small. Therefore, the contact between the vehicle and the obstacle can be avoided or suppressed appropriately or surely when the contact possibility is equal to or more than the predetermined threshold value and is relatively large.

On the other hand, the increasing rate of the deceleration becomes relatively small when the contact possibility is equal to or more than the predetermined threshold value and is relatively small. Therefore, the deceleration of the vehicle increases gradually when the contact possibility is equal to or more than the predetermined threshold value and is relatively small. Namely, the vehicle speed of the vehicle does not decrease very rapidly when the contact possibility is equal to or more than the predetermined threshold value and is relatively small. Therefore, there is really very litter or no case that the brake assist control is performed excessively even when the contact possibility is equal to or more than the predetermined threshold value and is relatively small. Thus, the responsiveness of the driver with respect to the brake operation improves.

Next, the case where the contact possibility is not equal to or more than the predetermined threshold value is explained. In this case, the increasing rate of the deceleration is fixed. Therefore, there is really very litter or no case that the brake assist control is performed excessively even when the contact possibility is not equal to or more than the predetermined threshold value. Thus, the responsiveness of the driver with respect to the brake operation improves.

Incidentally, the changing device may change the increasing rate of the deceleration such that the higher the contact possibility is, the larger the increasing rate of the deceleration is, instead of changing the increasing rate of the deceleration in the above described manner.

[5]

In an another aspect of the first brake control apparatus of the present invention, the changing device changes at least one of a decreasing rate of a first deceleration and the increasing rate of a second deceleration such that the higher the contact possibility is, the larger an absolute value of a difference between the decreasing rate of the first deceleration and the increasing rate of the second deceleration is, the first deceleration is the deceleration when the brake assist control is performed such that the deceleration decreases as time passes, the second deceleration is the deceleration when the brake assist control is performed such that the deceleration increases as time passes.

According to this aspect, the brake assist control which achieves an appropriate deceleration adapting to the contact possibility is performed.

Incidentally, if the decreasing rate of the first deceleration is changed such that the larger the contact possibility is, the smaller the decreasing rate of the first deceleration is and the increasing rate of the second deceleration is changed such that the larger the contact possibility is, the larger the increasing rate of the second deceleration is, the larger the contact possibility is, the larger the absolute value of the difference between the decreasing rate of the first deceleration and the increasing rate of the second deceleration is. Therefore, if at least one of the decreasing rate of the first deceleration and the increasing rate of the second deceleration are changed such that the larger the contact possibility is, the larger the absolute value of the difference between the decreasing rate of the first deceleration and the increasing rate of the second deceleration is, the above described various effect can be enjoyed. Namely, the contact between the vehicle and the obstacle can be avoided or suppressed appropriately or surely when the contact possibility is relatively high, while there is really very litter or no case that the brake assist control is performed excessively even when the contact possibility is relatively low.

[6]

In an another aspect of the first brake control apparatus of the present invention, the calculating device calculates, as the contact possibility, a collision prediction time until the vehicle collides with the obstacle.

According to this aspect, the changing device is capable of changing the decreasing rate of the deceleration of the vehicle on the basis of the collision prediction time which indicates the contact possibility. Incidentally, typically, the smaller the collision prediction time is, the larger the contact possibility is.

[7]

In an another aspect of the above described first brake control apparatus which calculates the collision prediction time, the changing device changes, on the basis of the collision prediction time, the decreasing rate of the deceleration when the brake assist control is performed such that the deceleration decreases as time passes.

According to this aspect, the changing device is capable of changing the decreasing rate of the deceleration of the vehicle caused by the brake assist control when the driver performs the brake operation in the returning direction (namely, the brake assist control is performed such that the deceleration of the vehicle decreases as time passes).

[8]

In an another aspect of the above described first brake control apparatus which calculates the collision prediction time, the changing device changes the decreasing rate of the deceleration such that the shorter the collision prediction time is, the smaller the decreasing rate of the deceleration is.

According to this aspect, the brake assist control which achieves an appropriate deceleration adapting to the collision prediction time which is one example of the contact possibility is performed. Therefore, the above described various effect can be enjoyed. Namely, the contact between the vehicle and the obstacle can be avoided or suppressed appropriately or surely when the contact possibility is relatively high, while there is really very litter or no case that the brake assist control is performed excessively even when the contact possibility is relatively low.

[9]

In an another aspect of the above described first brake control apparatus which calculates the collision prediction time, the changing device changes, on the basis of the collision prediction time, an increasing rate of the deceleration when the brake assist control is performed such that the deceleration increases as time passes, the changing device (i) changes the increasing rate of the deceleration such that the shorter the collision prediction time is, the larger the increasing rate of the deceleration is, if the collision prediction time is equal to or more than a predetermined threshold value, and (ii) fixes the increasing rate of the deceleration, if the collision prediction time is not equal to or more than the predetermined threshold value.

According to this aspect, the brake assist control which achieves an appropriate deceleration adapting to the collision prediction time which is one example of the contact possibility is performed. Therefore, the above described various effect can be enjoyed. Namely, the contact between the vehicle and the obstacle can be avoided or suppressed appropriately or surely when the contact possibility is equal to or more than the predetermined threshold value and is relatively high, while there is really very litter or no case that the brake assist control is performed excessively even when the contact possibility is equal to or more than the predetermined threshold value and is relatively low. In addition, there is really very litter or no case that the brake assist control is performed excessively even when the contact possibility is not equal to or more than the predetermined threshold value.

[10]

In an another aspect of the above described first brake control apparatus which calculates the collision prediction time, the changing device at least one of a decreasing rate of a first deceleration and an increasing rate of a second deceleration such that the shorter the collision prediction time is, the larger an absolute value of a difference between the decreasing rate of the first deceleration and the increasing rate of the second deceleration is, the first deceleration is the deceleration when the brake assist control is performed such that the deceleration decreases as time passes, the second deceleration is the deceleration when the brake assist control is performed such that the deceleration increases as time passes.

According to this aspect, the brake assist control which achieves an appropriate deceleration adapting to the collision prediction time which is one example of the contact possibility is performed. Therefore, the above described various effect can be enjoyed. Namely, the contact between the vehicle and the obstacle can be avoided or suppressed appropriately or surely when the contact possibility is relatively high, while there is really very litter or no case that the brake assist control is performed excessively even when the contact possibility is relatively low.

(Second Brake Control Apparatus)

[11]

A second brake control apparatus of the present invention is a brake control apparatus which performs a brake assist control for assisting a brake operation by a driver of a vehicle when an obstacle exists anterior to the vehicle, the brake control apparatus is provided with: a calculating device which calculates a contact possibility of the vehicle contacting the obstacle; and a changing device which changes at least one of a decreasing rate of a first deceleration and an increasing rate of a second deceleration such that the higher the contact possibility is, the larger an absolute value of a difference between the decreasing rate of the first deceleration and the increasing rate of the second deceleration, the first deceleration being a deceleration of the vehicle when the brake assist control is performed such that the deceleration decreases as time passes, the second deceleration is a deceleration when the brake assist control is performed such that the deceleration increases as time passes.

According to the second brake control apparatus of the present invention, the calculating device calculates the contact possibility of the vehicle contacting the obstacle. Incidentally, the calculating device which the second brake control apparatus is provided with may be same as the calculating device which the first brake control apparatus is provided with.

In the second brake control apparatus, the changing device changes at least one of (preferably, both of) the decreasing rate of the first deceleration and the increasing rate of the second deceleration. Incidentally, the first deceleration means a deceleration of the vehicle when the brake assist control is performed such that the deceleration decreases as time passes. The first deceleration is typically a deceleration when the driver performs the brake operation toward the returning direction (namely, the brake assist control is performed such that the deceleration of the vehicle decreases as time passes). Moreover, the second deceleration means a deceleration when the brake assist control is performed such that the deceleration increases as time passes. The second deceleration is typically a deceleration when the driver performs the brake operation toward the pressing direction (namely, the brake assist control is performed such that the deceleration of the vehicle increases as time passes). The technical meaning of another term is same as that in the first brake control apparatus.

Especially in the second brake control apparatus, the changing device changes at least one of (preferably, both of) the decreasing rate of the first deceleration and the increasing rate of the second deceleration such that the higher the contact possibility is, the larger the absolute value of the difference between the decreasing rate of the first deceleration and the increasing rate of the second deceleration. In other words, especially in the second brake control apparatus, the changing device changes at least one of (preferably, both of) the decreasing rate of the first deceleration and the increasing rate of the second deceleration such that the higher the contact possibility is, the larger the difference between the absolute value of the decreasing rate of the first deceleration and the absolute value of the increasing rate of the second deceleration.

Here, as explained in the above first brake control apparatus, if the decreasing rate of the first deceleration is changed such that the larger the contact possibility is, the smaller the decreasing rate of the first deceleration is and the increasing rate of the second deceleration is changed such that the larger the contact possibility is, the larger the increasing rate of the second deceleration is, the larger the contact possibility is, the larger the absolute value of the difference between the decreasing rate of the first deceleration and the increasing rate of the second deceleration is. Therefore, if at least one of (preferably, both of) the decreasing rate of the first deceleration and the increasing rate of the second deceleration are changed such that the larger the contact possibility is, the larger the absolute value of the difference between the decreasing rate of the first deceleration and the increasing rate of the second deceleration is, the above described various effect can be enjoyed even by the second brake control apparatus. Namely, the contact between the vehicle and the obstacle can be avoided or suppressed appropriately or surely when the contact possibility is relatively high, while there is really very litter or no case that the brake assist control is performed excessively even when the contact possibility is relatively low.

As described above, according to the second brake control apparatus, the decreasing rate of the deceleration of the vehicle caused by the brake assist control is changed on the basis of the contact possibility. Thus, the brake assist control which achieves an appropriate deceleration adapting to the contact possibility is performed.

Incidentally, the second brake control apparatus may incorporate various aspects, in response to various aspects which the above described first brake control apparatus described later incorporates.

[12]

In another aspect of the second brake control apparatus of the present invention, the changing device changes the decreasing rate of the first deceleration such that the higher the contact possibility is, the smaller the decreasing rate of the first deceleration is.

According to this aspect, the brake assist control which achieves an appropriate deceleration adapting to the contact possibility is performed. Therefore, the above described various effect can be enjoyed. Namely, the contact between the vehicle and the obstacle can be avoided or suppressed appropriately or surely when the contact possibility is relatively high, while there is really very litter or no case that the brake assist control is performed excessively even when the contact possibility is relatively low.

[13]

In another aspect of the second brake control apparatus of the present invention, the changing device changes the increasing rate of the second deceleration such that the higher the contact possibility is, the larger the increasing rate of the second deceleration is.

According to this aspect, the brake assist control which achieves an appropriate deceleration adapting to the contact possibility is performed. Therefore, the above described various effect can be enjoyed. Namely, the contact between the vehicle and the obstacle can be avoided or suppressed appropriately or surely when the contact possibility is relatively high, while there is really very litter or no case that the brake assist control is performed excessively even when the contact possibility is relatively low.

In an another aspect of the second brake control apparatus of the present invention, the calculating device calculates, as the contact possibility, a collision prediction time until the vehicle collides with the obstacle.

According to this aspect, the changing device is capable of changing at least one of (preferably, both of) the decreasing rate of the first deceleration and the increasing rate of the second deceleration on the basis of the collision prediction time which indicates the contact possibility.

[15]

In an another aspect of the above described second brake control apparatus which calculates the collision prediction time, the changing device changes the decreasing rate of the first deceleration such that the shorter the collision prediction time is, the smaller the decreasing rate of the first deceleration is.

According to this aspect, the brake assist control which achieves an appropriate deceleration adapting to the collision prediction time which is one example of the contact possibility is performed. Therefore, the above described various effect can be enjoyed. Namely, the contact between the vehicle and the obstacle can be avoided or suppressed appropriately or surely when the contact possibility is relatively high, while there is really very litter or no case that the brake assist control is performed excessively even when the contact possibility is relatively low.

[16]

In an another aspect of the above described second brake control apparatus which calculates the collision prediction time, the changing device changes the increasing rate of the second deceleration such that the shorter the collision prediction time is, the larger the increasing rate of the second deceleration is.

According to this aspect, the brake assist control which achieves an appropriate deceleration adapting to the collision prediction time which is one example of the contact possibility is performed. Therefore, the above described various effect can be enjoyed. Namely, the contact between the vehicle and the obstacle can be avoided or suppressed appropriately or surely when the contact possibility is relatively high, while there is really very litter or no case that the brake assist control is performed excessively even when the contact possibility is relatively low.

The operation and other advantages of the present invention will become more apparent from embodiments explained below.

DESCRIPTION OF EMBODIMENTS

Hereinafter, an embodiment of the present invention will be explained with reference to the drawings.

(1) Configuration of Vehicle

Figure 1:
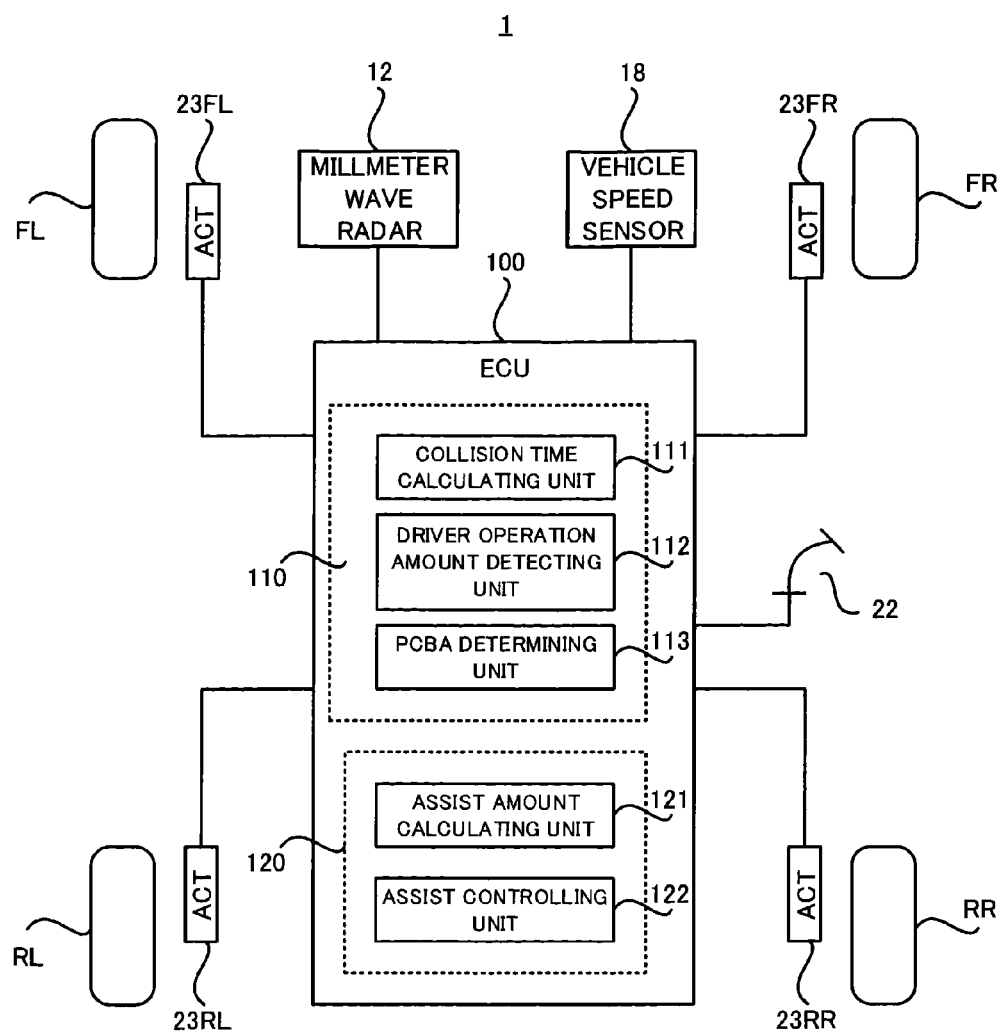
FIG. 1 is a block diagram illustrating one example of the configuration of the vehicle of the present embodiment.

Firstly, with reference to FIG. 1, a configuration of the vehicle 1 of the present embodiment will be explained. FIG. 1 is a block diagram illustrating one example of the configuration of the vehicle 1 of the present embodiment.

As illustrated in FIG. 1, the vehicle 1 is provided with: a millimeter wave radar 12; a vehicle speed sensor 18; a brake pedal 22; an ECU (Electronic Control Unit) 100; a left front wheel FL; a right front wheel FR; a left rear wheel RL; a right rear wheel RR; an actuator 23FL; an actuator 23FR; an actuator 23RL; and an actuator 23RR.

The ECU 100 is provided with, in its inside, a collision determination ECU block 110 and a brake assist ECU block 120, as a physical processing circuit or as a logical processing block.

The collision determination ECU block 110 determines a possibility of the vehicle 1 colliding with an obstacle which exists anterior to the vehicle 1 (in other words, a possibility of the vehicle 1 and the obstacle existing at the same place after a lapse of a predetermined time). Incidentally, the existence of the obstacle is detected by the millimeter wave radar 12. In order to determine the possibility of the vehicle 1 colliding with the obstacle, the collision determination ECU block 110 is provided with a collision time calculating unit 111, a driver operation amount detecting unit 112 and a PCBA (Pre Crash Brake Assist) determining unit 113. Incidentally, the collision determination ECU block 110 is one example of the "calculating device".

The collision time calculating unit 111 calculates a collision prediction time TTC which is a time required for the vehicle 1 to collide with the obstacle. The collision time calculating unit 111 may calculate the collision prediction time TTC on the basis of at least one of a vehicle speed V1 of the vehicle 1, a relative velocity V2 between the vehicle 1 and the obstacle and a relative distance D between the vehicle 1 and the obstacle. Incidentally, the vehicle speed V1 of the vehicle 1 is detected by the vehicle speed sensor 18. Moreover, the relative velocity V2 between the vehicle 1 and the obstacle and the relative distance D between the vehicle 1 and the obstacle are detected by the millimeter wave radar 12.

The driver operation amount detecting unit 112 detects the operational amount B of the brake pedal 22 operated by the driver of the vehicle 1.

The PCBA determining unit 113 determines whether or not the pre-crash brake assist control should be performed on the basis of the collision prediction time TTC which is calculated by the collision time calculating unit 111 and the operational amount B of the brake pedal 22 which is detected by the driver operation amount detecting unit 112. Incidentally, the pre-crash brake assist control is a control for assisting a driver's operation of the brake pedal 22. Namely, the pre-crash brake assist control is a control for adjusting a braking force by adding a subsidiary braking force to a braking force which is caused by the driver's operation of the brake pedal 22.

The brake assist ECU block 120 calculates an assist amount Greq for indicating the subsidiary braking force which should be added by the pre-crash brake assist control, when the PCBA determining unit 113 determines that the pre-crash brake assist control should be performed. In order to calculate the assist amount Greq, the brake assist ECU block 120 is provided with an assist amount calculating unit 121 and an assist controlling unit 122. Incidentally, the brake assist ECU block 120 is one example of the "changing device".

The assist amount calculating unit 121 calculates the assist amount Greq for directly or indirectly indicating the braking force which should be added by the pre-crash brake assist control, on the basis of the collision prediction time TTC which is calculated by the collision time calculating unit 111 and the operational amount B of the brake pedal 22 which is detected by the driver operation amount detecting unit 112.

The assist controlling device 122 adds the braking force according to the assist amount Greq which is calculated by the assist amount calculating unit 121 to the braking force which is caused by the driver's operation of the brake pedal 22. Specifically, the assist controlling unit 122 controls each of the actuator 23FL, the actuator 23FR, the actuator 23RL and the actuator 23RR such that the braking force according to the assist amount Greq is added. As a result, braking forces of the left front wheel FL, the right front wheel FR, the left rear wheel RL and the right rear wheel RR are adjusted (for example, increased or decreased) by the braking force according to the assist amount Greq, by the operation of the actuator 23FL, the actuator 23FR, the actuator 23RL and the actuator 23RR each of which has a function of pressuring brake fluid.

Incidentally, FIG. 1 illustrates an example in which the actuator 23FL, the actuator 23FR, the actuator 23RL and the actuator 23RR which respectively corresponds to the right front wheel FR, the left rear wheel RL and the right rear wheel RR are provided in order to assist the braking force. Namely, FIG. 1 illustrates an example in which what we call an ABS actuator is provided for each wheel in order to assist the braking force. However, in order to assist the braking force, the vehicle 1 may be provided with a single pressuring pump, which has a function of pressuring, on a flow pipe of the brake fluid, in addition to or instead of the actuator 23FL, the actuator 23FR, the actuator 23RL and the actuator 23RR.

(2) Operation of Vehicle

Next, with reference to FIG. 2 to FIG. 6, an operation (especially, an operation which is related to the pre-crash brake assist control) which is performed by the vehicle 1 of the present embodiment will be explained.

(2-1) Entire Flow of Operation of Vehicle

Figure 2:
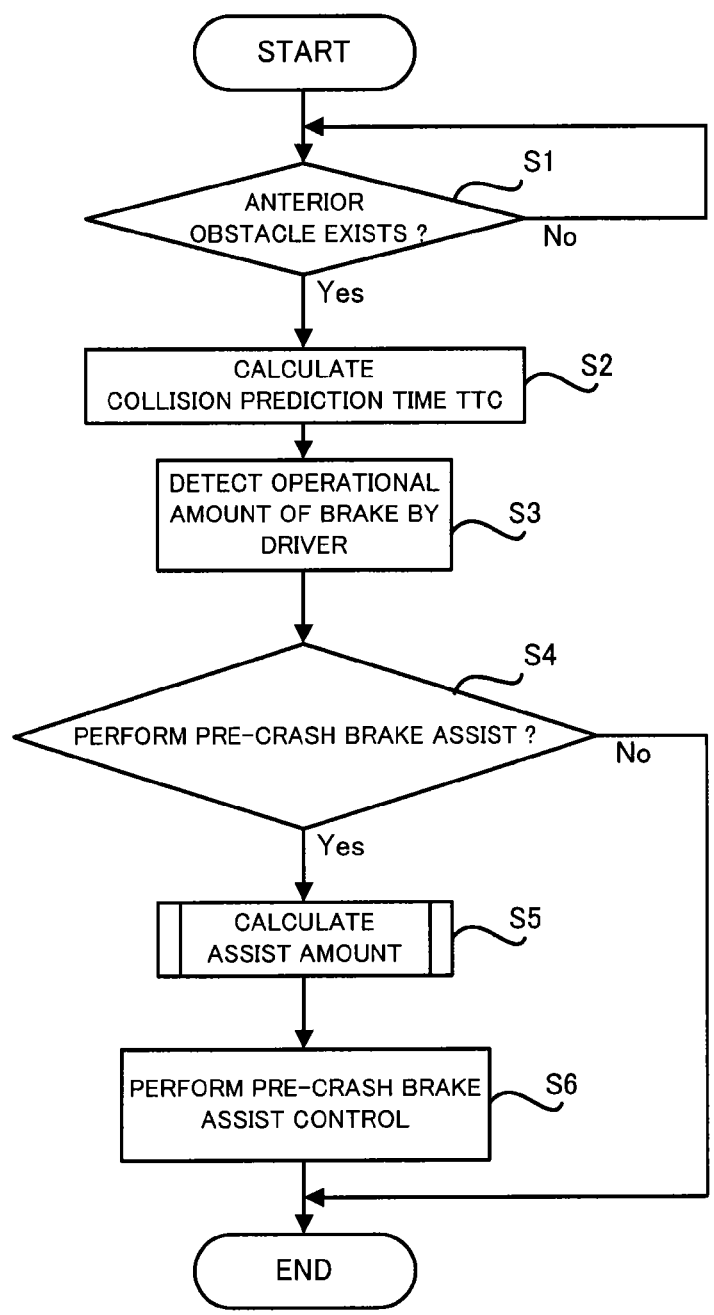
FIG. 2 is a flow chart illustrating the entire flow of the operation (especially, an operation which is related to the pre-crash brake assist control) which is performed by the vehicle of the present embodiment.

Firstly, with reference to FIG. 2, an entire flow of the operation (especially, an operation which is related to the pre-crash brake assist control) which is performed by the vehicle 1 of the present embodiment will be explained. FIG. 2 is a flow chart illustrating the entire flow of the operation (especially, an operation which is related to the pre-crash brake assist control) which is performed by the vehicle 1 of the present embodiment.

As illustrated in FIG. 2, the collision time calculating unit 111 determines whether or not the obstacle exists anterior to the vehicle 1 (in other words, in a traveling direction of the vehicle) by monitoring a detection result of the millimeter wave radar 12 (step S1). Incidentally, another vehicle which is traveling anterior to the vehicle 1, a fallen object which is fallen anterior to the vehicle 1, a person which exists anterior to the vehicle and the like are listed as one example of the obstacle.

As a result of the determination at the step S1, if it is determined that the obstacle does not exist anterior to the vehicle 1 (step S1: No), the collision time calculating unit 111 continues to determine whether or not the obstacle exists anterior to the vehicle 1.

On the other hand, as a result of the determination at the step S1, if it is determined that the obstacle exists anterior to the vehicle 1 (step S1: Yes), the collision time calculating unit 111 calculates the collision prediction time TTC which is the time required for the vehicle 1 to collide with the obstacle (step S2). Incidentally, the "collision prediction time TTC" here substantially means a time required for the vehicle 1 to reach a place where the obstacle exists (in other words, a time required for the vehicle 1 and the obstacle to exist in the same place).

In this case, the collision time calculating unit 111 may calculate the collision prediction time TTC on the basis of at least one of the vehicle speed V1 of the vehicle 1 which is detected by the vehicle speed sensor 18, the relative velocity V2 between the vehicle 1 and the obstacle which is detected by the millimeter wave radar 12, and the relative distance D between the vehicle 1 and the obstacle which is detected by the millimeter wave radar 12. For example, if the obstacle is moving, the collision time calculating unit 111 may calculate the collision prediction time TTC by using a formula of the collision prediction time TTC=the relative distance D between the vehicle 1 and the obstacle/the relative velocity V2 between the vehicle 1 and the obstacle. Alternatively, for example, if the obstacle is not moving, the collision time calculating unit 111 may calculate the collision prediction time TTC by using a formula of the collision prediction time TTC=the relative distance D between the vehicle 1 and the obstacle/the vehicle speed V1 of the vehicle 1 (however, the vehicle speed V1 of the vehicle 1 is equal to the relative velocity V2 between the vehicle 1 and the obstacle, if the obstacle is not moving).

Then, the driver operation amount detecting unit 112 detects the operational amount B of the brake pedal 22 operated by the driver of the vehicle 1 (step S3). Incidentally, the driver operation amount detecting unit 112 may detect, as the operational amount B of the brake pedal 22, a pressing amount of the brake pedal 22. Alternatively, the driver operation amount detecting unit 112 may detect, as the operational amount B of the brake pedal 22, a pressing pressure of the brake pedal 22. Alternatively, the driver operation amount detecting unit 112 may detect, as the operational amount B of the brake pedal 22, a pressing velocity of the brake pedal 22. Alternatively, incidentally, the driver operation amount detecting unit 112 may detect, as the operational amount B of the brake pedal 22, an arbitrary parameter which is related to the press and the like of the brake pedal 22.

Then, the PCBA determining unit 113 determines whether or not the pre-crash brake assist control should be performed (step S4). In this case, the PCBA determining unit 113 may determine whether or not the pre-crash brake assist control should be performed on the basis of at least one of the collision prediction time TTC which is calculated by the collision time calculating unit 111 at the step S2 and the operational amount B of the brake pedal 22 which is detected by the driver operation amount detecting unit 112 at the step S3.

For example, it is preferable that the pre-crash brake assist control be performed more actively as the possibility (namely, a collision possibility) of the vehicle colliding with the obstacle become higher. On the other hand, the pre-crash brake assist control may not be performed very actively as the collision possibility become lower. Alternatively, it is preferable that the pre-crash brake assist control be performed actively as the collision possibility is equal to or more than a predetermined threshold value (for example, dozen percentages to fifty percentages or more percentage). On the other hand, the pre-crash brake assist control may not be performed very actively as the collision possibility is not equal to or more than the predetermined threshold value. The PCBA determining unit 113 may determine from this viewpoint whether or not the pre-crash brake assist control should be performed.

Specifically, for example, the shorter the collision prediction time TCC is, the higher the collision possibility is. In other words, the longer the collision prediction time TCC is, the lower the collision possibility is. Thus, the PBCA determining unit 113 may determine that the pre-crash brake assist control should be performed, if the collision prediction time TCC is equal to or more than a predetermined time. On the other hand, the PBCA determining unit 113 may determine that the pre-crash brake assist control should not be performed, if the collision prediction time TCC is not equal to or more than the predetermined time.

Alternatively, the larger the operational amount B of the brake pedal 22 operated by the driver is (for example, the larger the pressing amount of the brake pedal 22 is), the more rapidly the vehicle 1 decelerates and thus the lower the collision possibility is. In other words, the smaller the operational amount B of the brake pedal 22 operated by the driver is (for example, the smaller the pressing amount of the brake pedal 22 is), the more gradually the vehicle 1 decelerates and thus the higher the collision possibility is. Thus, the PBCA determining unit 113 may determine that the pre-crash brake assist control should be performed, if the operational amount B of the brake pedal 22 is not equal to or more than a predetermined amount. On the other hand, the PBCA determining unit 113 may determine that the pre-crash brake assist control should not be performed, if the operational amount B of the brake pedal 22 is equal to or more than a predetermined amount.

Alternatively, the vehicle speed V1 of the vehicle 1 typically decreases if the braking force according to the operational amount B of the brake pedal 22 is added. As a result, the collision prediction time TTC increases due to the decreasing of the vehicle speed V1 of the vehicle 1. Namely, the collision prediction time TCC varies depending on the operational amount B of the brake pedal 22. Therefore, it is preferable that the PCBA determining unit 113 determine the collision possibility by totally analyzing both of the collision prediction time TCC and the operational amount B of the brake pedal 22. As a result, the PCBA determining unit 113 preferably determines that the pre-crash brake assist control should be performed, if the collision possibility is relatively high.

As a result of the determination of the step S4, it is determined that the pre-crash brake assist control should not be performed (step S4: No), the pre-crash brake assist control at the step S5 and the step S6 is not performed.

As a result of the determination of the step S4, it is determined that the pre-crash brake assist control should be performed (step S4: Yes), the pre-crash brake assist control at the step S5 and the step S6 is performed.

Specifically, firstly, the assist amount calculating unit 121 calculates the assist amount Greq for directly or indirectly indicating the braking force which should be added by the pre-crash brake assist control, on the basis of the collision prediction time TTC which is calculated by the collision time calculating unit 111 at the step S2 and the operational amount B of the brake pedal 22 which is detected by the driver operation amount detecting unit 112 at the step S3 (step S5). Incidentally, a flow of the specific calculation operation of the assist amount Greq performed by the assist amount calculating unit 121 will be explained in detail later (see FIG. 3 to FIG. 5).

Then, the assist controlling unit 122 performs the pre-crash brake assist control according to the assist amount Greq which is calculated by the assist amount calculating unit 121 at the step S5 (step S6). Specifically, the assist controlling unit 122 adds the braking force according to the assist amount Greq which is calculated by the assist amount calculating unit 121 at the step S5 to the braking force which is caused by the driver's operation of the brake pedal 22. More specifically, the assist controlling unit 122 controls each of the actuator 23FL, the actuator 23FR, the actuator 23RL and the actuator 23RR such that the braking force according to the assist amount Greq is added. As a result, braking forces of the left front wheel FL, the right front wheel FR, the left rear wheel RL and the right rear wheel RR are adjusted by the braking force according to the assist amount Greq, by the operation of the actuator 23FL, the actuator 23FR, the actuator 23RL and the actuator 23RR each of which has the function of pressuring the brake fluid.

(2-2) Flow of Calculation Operation of Assist Amount

Figure 3:
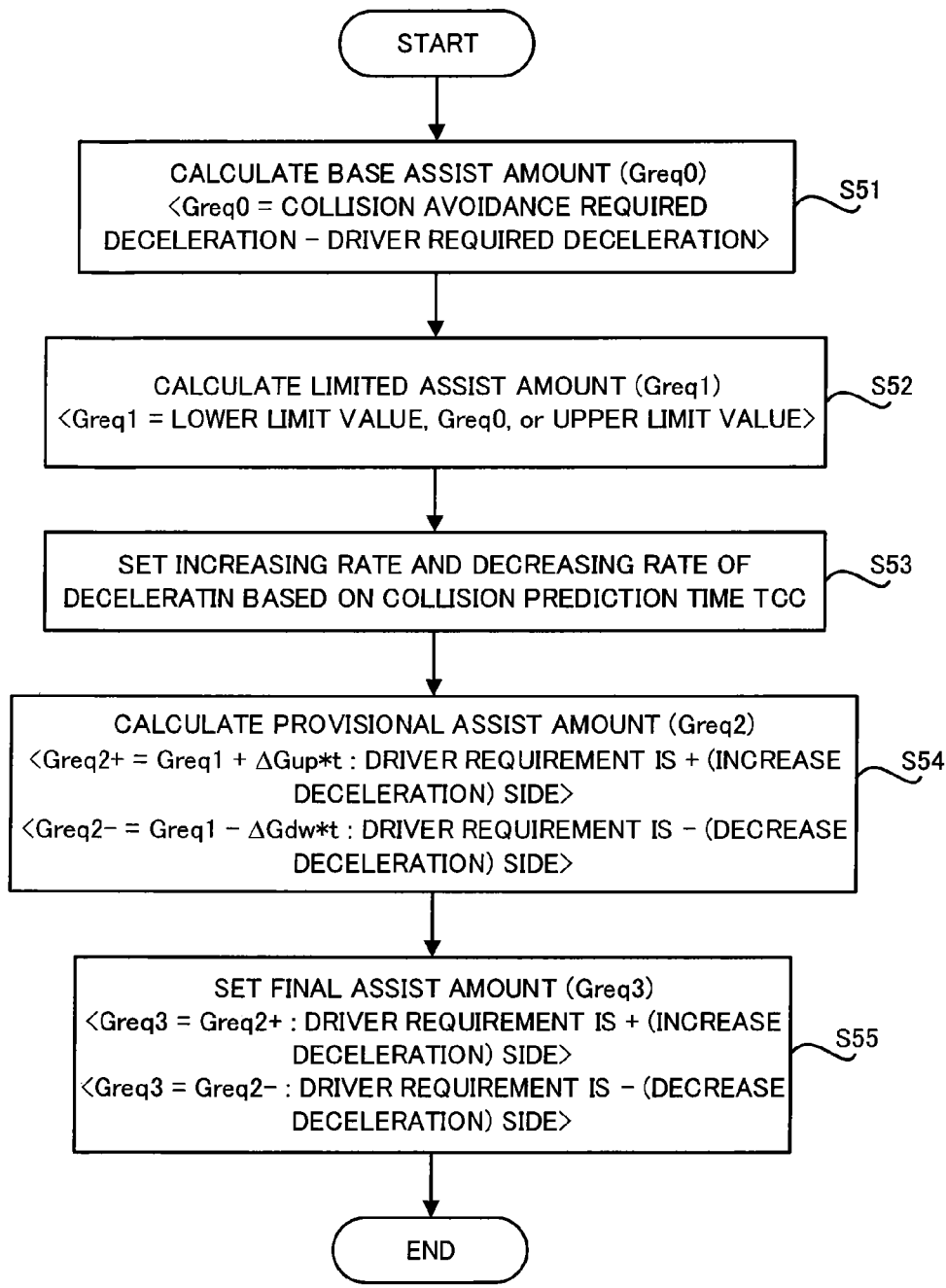
FIG. 3 is a flow chart illustrating the flow of the calculation operation of the assist amount performed by the assist amount calculating unit.

Next, with reference to FIG. 3, a flow of the calculation operation of the assist amount Greq performed by the assist amount calculating unit 121 will be explained. FIG. 3 is a flow chart illustrating the flow of the calculation operation of the assist amount Greq performed by the assist amount calculating unit 121. Incidentally, hereinafter, an explanation will be given in the condition where the deceleration which is achieved by the pre-crash brake assist control is used as one example of the assist amount Greq, for the purpose of the simplification and the clarification of the explanation.

As illustrated in FIG. 3, the assist amount calculating unit 121 calculates a base assist amount Greq0 (step S51). In this case, the assist amount calculating unit 121 may calculates the base assist amount Greq0 on the basis of a collision avoidance required deceleration which is calculated from the collision prediction time TTC and a driver required deceleration which is calculated from the operational amount B of the brake pedal 22. Specifically, the assist amount calculating unit 121 may calculate, as the base assist amount Greq0, a deceleration which is obtained by subtracting the driver required deceleration which is calculated from the operational amount B of the brake pedal 22 from the collision avoidance required deceleration which is calculated from the collision prediction time TTC.

Incidentally, the collision avoidance required deceleration is a deceleration which is required for preventing the vehicle 1 from colliding with the obstacle (in other words, the vehicle 1 from reaching the place where the obstacle exists). For example, the collision avoidance required deceleration is a deceleration which is required for reducing the vehicle speed V1 of the vehicle or the relative velocity V2 between the vehicle 1 and the obstacle to zero within the collision prediction time TTC. In this case, the collision avoidance required deceleration is typically the vehicle speed V1 of the vehicle 1 (alternatively, the relative velocity V2 between the vehicle 1 and the obstacle)/the collision prediction time TTC. However, the collision avoidance required deceleration may be calculated by using another method.

Moreover, the driver required deceleration is a deceleration which is caused by adding the braking force according to the operational amount B of the brake pedal 22 to the vehicle 1.

Figure 4:
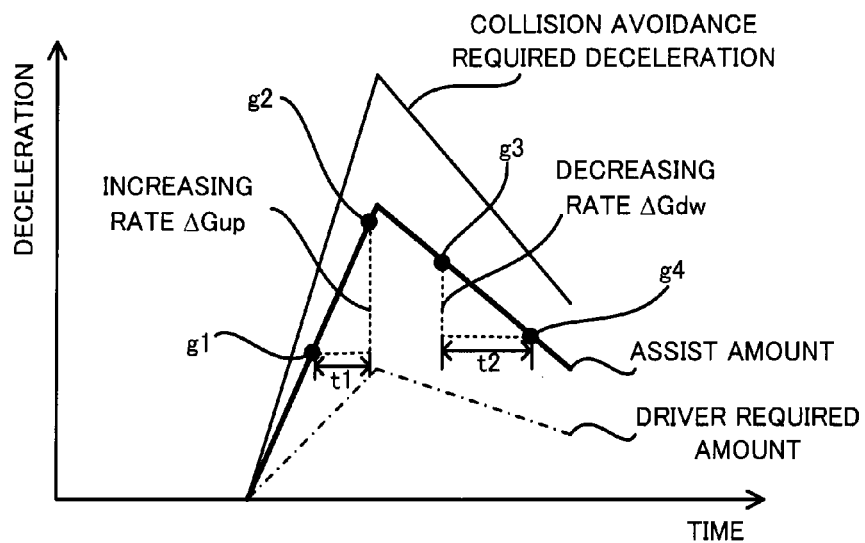
FIG. 4 is a graph illustrating a relationship among the collision avoidance required deceleration, the driver required deceleration and the base assist amount.

Here, with reference to FIG. 4, the collision avoidance required deceleration, the driver required deceleration and the base assist amount Greq0 will be explained. FIG. 4 is a graph illustrating a relationship among the collision avoidance required deceleration, the driver required deceleration and the base assist amount Greq0.

As illustrated in FIG. 4, the base assist amount Greq0 is the deceleration which is obtained by subtracting the driver required deceleration from the collision avoidance required deceleration (in other words, an assist amount Greg which corresponds to this deceleration).

Incidentally, in FIG. 4, a direction decreasing the vehicle speed V1 of the vehicle 1 is defined as a positive (plus) direction of the deceleration. Namely, in FIG. 4, the deceleration becomes a deceleration whose value is positive (plus), if the deceleration which decreases the vehicle speed V1 of the vehicle 1 is added to the vehicle 1. For example, the deceleration which changes the vehicle speed V1 of the vehicle 1 from 30 km/h (kilometer per hour) (10 m/s (meter per second)) to 7.2 km/h (2 m/s) within 2 seconds is "8 $m/s^2$=(10 m/s·2 m/s)/2 s".

By the way, FIG. 4 illustrates an example in which each of the collision avoidance required deceleration, the driver required deceleration and the base assist amount Greq0 increases and then decreases. This example corresponds to an operation of the brake pedal 22 which is performed by the driver in order to avoid the collision with the obstacle (alternatively, corresponds to a general operation of the brake pedal 22). Specifically, the driver who recognized the obstacle typically starts to press the brake pedal 22. As a result, the operational amount B of the brake pedal 22 increases gradually. As a result, the deceleration which is caused by the operational amount B of the brake pedal 22 also increases gradually. Then, the driver who anticipates the avoidance of the obstacle typically starts to return the brake pedal 22. As a result, the operational amount B of the brake pedal 22 decreases gradually. As a result, the deceleration which is caused by the operational amount B of the brake pedal 22 also decreases gradually. As a result, the driver required deceleration whose shape is inverted V illustrated in FIG. 4 is obtained. Moreover, it is preferable that the collision avoidance required deceleration change in a same aspect as the driver required deceleration change (namely, in an aspect like a graph whose shape is the inverted V illustrated in FIG. 4). Therefore, the assist amount Greq0, which is calculated on the basis of the collision avoidance required deceleration and the driver required deceleration, also changes in the aspect like a graph whose shape is the inverted V illustrated in FIG. 4.

Incidentally, the aspect of the change of each deceleration illustrated in FIG. 4 is one example. Each deceleration may change in an aspect which is different from the aspect illustrated in FIG. 4. Especially, each deceleration may often change so as to repeat the increasing and the decreasing depending on the delicate operation of the brake pedal 22 performed by the driver.

Here, in the present embodiment, as described later in detail, the assist amount calculating unit 121 adjusts an increasing rate ΔGup of the assist amount Greq in an area where the assist amount Greq (namely, the deceleration) increases and a decreasing rate ΔGdw of the assist amount Greq in an area where the assist amount Greq decreases, as occasion demands.

Here, the increasing rate ΔGup of the assist amount Greq indicates an increasing amount of the assist amount Greq per a unit time. For example, as illustrated in FIG. 4, if the assist amount Greq increases from g1 to g2 within a unit time t1, the increasing rate ΔGup of the assist amount Greq is (g2−g1)/g1. More specifically, if the assist amount Greq increases from 4 m/s$^2$ to 8 m/s$^2$ within the unit time t1, the increasing rate ΔGup of the assist amount Greq is (8 m/s$^2$−4 m/s$^2$)/8 m/s$^2$=0.5 (50%). However, the increasing rate ΔGup of the assist amount Greq typically corresponds to a slope of the assist amount Greq (in other words, an increasing slope, and substantially a differential value of the assist amount Greq).

Similarly, the decreasing rate ΔGdw of the assist amount Greq indicates a decreasing amount of the assist amount Greq per a unit time. For example, as illustrated in FIG. 4, if the assist amount Greq decreases from g3 to g4 within a unit time t2, the decreasing rate ΔGdw of the assist amount Greq is (g3−g4)/g3. More specifically, if the assist amount Greq decreases from 8 m/s$^2$ to 4 m/s$^2$ within the unit time t2, the decreasing rate ΔGdw of the assist amount Greq is (8 m/s$^2$−4 m/s$^2$)/8 m/s$^2$=0.5 (50%). However, the decreasing rate ΔGdw of the assist amount Greq typically corresponds to the slope of the assist amount Greq (in other words, a decreasing slope, and substantially the differential value of the assist amount Greq).

Incidentally, FIG. 4 illustrates an example in which the driver required deceleration increases if the driver presses the brake pedal 22 and the driver required deceleration decreases if the driver returns the brake pedal 22. However, even if the driver does not press the brake pedal 22 (for example, the operational amount of the brake pedal 22 performed by the driver is kept to be constant), the driver required deceleration may increases in some cases because of an influence of a master cylinder and the like. Even if the driver does not return the brake pedal 22 (for example, the operational amount of the brake pedal 22 performed by the driver is kept to be constant), the driver required deceleration may decreases in some cases because of the influence of the master cylinder and the like.

Again in FIG. 3, then the assist amount calculating unit 121 calculates a limited assist amount Greq1 by limiting an upper limit and a lower limit of the base assist Greq0 which is calculated at the step S51 (step S52). Specifically, if the base assist amount Greq0 is not more than an upper limit value which is set in advance or arbitrary and the base assist amount Greq0 is not less than a lower limit value which is set in advance or arbitrary, the assist amount calculating unit 121 regards the base assist amount Greq0 as the limited assist amount Greq1. On the other hand, if the base assist amount Greq0 is more than the upper limit value which is set in advance or arbitrary, the assist amount calculating unit 121 regards the upper limit value as the limited assist amount Greq1. On the other hand, if the base assist amount Greq0 is less than the lower limit value which is set in advance or arbitrary, the assist amount calculating unit 121 regards the lower limit value as the limited assist amount Greq1.

Then, the assist amount calculating unit 121 sets the increasing rate ΔGup and the decreasing rate ΔGdw of the assist amount Greq (namely, the deceleration) on the basis of the collision prediction time TCC (step S53).

Figure 5:
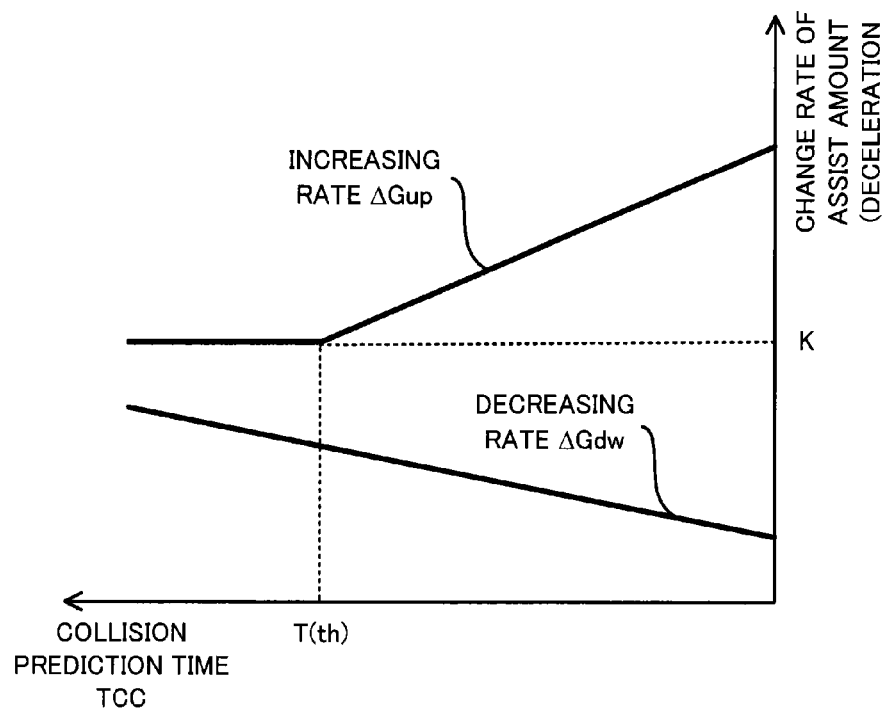
FIG. 5 is a graph illustrating a relationship among between the increasing rate and the decreasing rate and the collision prediction time.

Here, with reference to FIG. 5, an aspect of setting the increasing rate ΔGup and the decreasing rate ΔGdw will be explained. FIG. 5 is a graph illustrating a relationship among the increasing rate ΔGup and the decreasing rate ΔGdw and the collision prediction time TCC.

As illustrated in FIG. 5, the assist amount calculating unit 121 sets the increasing rate ΔGup of the assist amount Greq such that the increasing rate ΔGup of the assist amount Greq (namely, the deceleration) becomes larger as the collision prediction time TCC is smaller, in an area where the collision prediction time TCC is equal to or less than a predetermined time T(th). On the other hand, the assist amount calculating unit 121 sets the increasing rate ΔGup of the assist amount Greq such that the increasing rate ΔGup of the assist amount Greq becomes a predetermined value K (namely, is fixed to the predetermined value K) regardless of the collision prediction time TCC, in an area where the collision prediction time TCC is equal to or more than the predetermined time T(th).

However, the assist amount calculating unit 121 may set the increasing rate ΔGup of the assist amount Greq such that the increasing rate ΔGup of the assist amount Greq (namely, the deceleration) becomes larger as the collision prediction time TCC is smaller, regardless of the magnitude relationship between the collision prediction time TCC and the predetermined time T(th).

Moreover, the assist amount calculating unit 121 sets the decreasing rate ΔGdw of the assist amount Greq such that the decreasing rate ΔGdw of the assist amount Greq becomes smaller as the collision prediction time TCC is smaller.

As recognized from FIG. 5, the assist amount calculating unit 121 sets the increasing rate ΔGup and the decreasing rate ΔGdw of the assist amount Greq such that an absolute value |ΔGup−ΔGdw| of a difference between the increasing rate ΔGup of the assist amount Greq and the decreasing rate ΔGdw of the assist amount Greq becomes smaller larger as the collision prediction time TCC is smaller. Namely, the assist amount calculating unit 121 sets the increasing rate ΔGup and the decreasing rate ΔGdw of the assist amount Greq such that an absolute value |ΔGup−ΔGdw| of a difference between an absolute value |ΔGup| of the increasing rate ΔGup of the assist amount Greq and an absolute value |ΔGdw| of the decreasing rate ΔGdw of the assist amount Greq becomes smaller larger as the collision prediction time TCC is smaller.

Again in FIG. 3, then, the assist amount calculating unit 121 calculates a provisional assist amount Greq2 on the basis of the limited assist amount Greq1 which is calculated at the step S52 and the increasing rate ΔGup and the decreasing rate ΔGdw of the assist amount Greq which are set at the step S53 (step S54).

Specifically, the assist amount calculating unit 121 calculates, as a provisional assist amount Greq2+ which is used when the driver required deceleration increases, a value which is obtained by increasing the limited assist amount Greq1 by the increasing rate ΔGup which is set at the step S53. Namely, the assist amount calculating unit 121 calculates the provisional assist amount Greq2+ which is used when the driver required deceleration increases by using a formula of Greq2+=Greq1+ΔGup*t (wherein, t is an elapsed time after the pre-crash brake assist control starts to be performed, and substantially corresponds to a vertical axis in FIG. 4). Incidentally, the driver required deceleration increases when the driver operates the brake pedal 22 in a pressing direction (namely, when the pre-crash brake assist control is performed in an area on a relative left side of the graph of FIG. 4).

In addition, the assist amount calculating unit 121 calculates, as a provisional assist amount Greq2− which is used when the driver required deceleration decreases, a value which is obtained by decreasing the limited assist amount Greq1 by the decreasing rate ΔGdw which is set at the step S53. Namely, the assist amount calculating unit 121 calculates the provisional assist amount Greq2− which is used when the driver required deceleration decreases by using a formula of Greq2−=Greq1−ΔGdw*t. Incidentally, the driver required deceleration decreases when the driver operates the brake pedal 22 in a returning direction (namely, when the pre-crash brake assist control is performed in an area on a relative right side of the graph of FIG. 4).

Then, the assist amount calculating unit 121 sets a final assist amount Greq3 depending on the current driver required deceleration (alternatively, an operational direction of the brake pedal 22 operated by the driver) (step S55). The final assist amount Greq3 is used as the above described assist amount Greq.

Specifically, when the driver required deceleration increases, the assist amount calculating unit 121 sets the provisional assist amount Greq2+ which is used when the driver required deceleration increases as the final assist amount Greq3. In other words, when the driver operates the brake pedal 22 in the pressing direction, the assist amount calculating unit 121 sets the provisional assist amount Greq2+ which is used when the driver required deceleration increases as the final assist amount Greq3. In other words more, when the pre-crash brake assist control is performed in an area on the relative left side of the graph of FIG. 4, the assist amount calculating unit 121 sets the provisional assist amount Greq2+ which is used when the driver required deceleration increases as the final assist amount Greq3.

On the other hand, when the driver required deceleration decreases, the assist amount calculating unit 121 sets the provisional assist amount Greq2− which is used when the driver required deceleration decreases as the final assist amount Greq3. In other words, when the driver operates the brake pedal 22 in the returning direction, the assist amount calculating unit 121 sets the provisional assist amount Greq2− which is used when the driver required deceleration decreases as the final assist amount Greq3. In other words more, when the pre-crash brake assist control is performed in an area on the relative right side of the graph of FIG. 4, the assist amount calculating unit 121 sets the provisional assist amount Greq2− which is used when the driver required deceleration decreases as the final assist amount Greq3.

Figure 6:
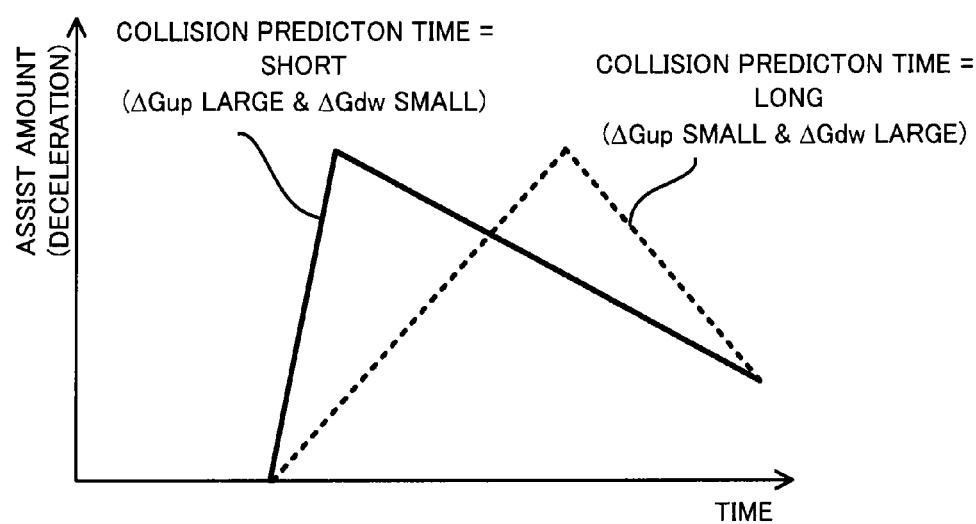
FIG. 6 is a graph illustrating an aspect of the changing of the assist amount when the collision prediction time is relatively long and an aspect of the changing of the assist amount when the collision prediction time is relatively short.

(2-3) Aspect of Changing of Assist Amount Depending on Collision Prediction Time Next, with reference to FIG. 6, an effect which is achieved by the vehicle of the present embodiment will be explained with an aspect of the changing of the assist amount Greq depending on the collision prediction time TTC. FIG. 6 is a graph illustrating an aspect of the changing of the assist amount Greq when the collision prediction time TTC is relatively long and an aspect of the changing of the assist amount Greq when the collision prediction time TTC is relatively short.

Firstly, with reference to the solid graph in FIG. 6, the aspect of the changing of the assist amount Greq when the collision prediction time TTC is relatively short (when the collision possibility is relatively large) will be explained.

The increasing rate ΔGup of the assist amount Greq is relatively larger in the case where the collision prediction time TTC is relatively short, compared to the case where the collision prediction time TTC is relatively long. As a result, as illustrated by the solid graph in FIG. 6, the assist amount Greq increases more rapidly along with the start of the pre-crash brake assist control in the case where the collision prediction time TTC is relatively short, compared to the case where the collision prediction time TTC is relatively long. Namely, the vehicle speed V1 of the vehicle 1 decreases easily. Therefore, the vehicle 1 can stop at a relatively earlier timing in the case where the collision prediction time TTC is relatively short, compared to the case where the collision prediction time TTC is relatively long. Alternatively, the possibility of the vehicle 1 contacting the obstacle can be reduced or can become zero at a relatively earlier timing in the case where the collision prediction time TTC is relatively short, compared to the case where the collision prediction time TTC is relatively long. Therefore, the contact between the vehicle 1 and the obstacle can be avoided or suppressed appropriately or surely, when the collision prediction time TTC is relatively short and thus the contact possibility is relatively high.

In addition, the decreasing rate ΔGdw of the assist amount Greq is relatively smaller in the case where the collision prediction time TTC is relatively short, compared to the case where the collision prediction time TTC is relatively long. As a result, as illustrated by the solid graph in FIG. 6, the assist amount Greq decreases more gradually in the case where the collision prediction time TTC is relatively short, compared to the case where the collision prediction time TTC is relatively long. Namely, the vehicle speed V1 of the vehicle 1 decreases easily. Therefore, the vehicle 1 can stop at a relatively earlier timing in the case where the collision prediction time TTC is relatively short, compared to the case where the collision prediction time TTC is relatively long. Alternatively, the possibility of the vehicle 1 contacting the obstacle can be reduced or can become zero at a relatively earlier timing in the case where the collision prediction time TTC is relatively short, compared to the case where the collision prediction time TTC is relatively long. Therefore, the contact between the vehicle 1 and the obstacle can be avoided or suppressed appropriately or surely when the collision prediction time TTC is relatively short and thus the contact possibility is relatively high.

Next, with reference to the dashed graph in FIG. 6, the aspect of the changing of the assist amount Greq when the collision prediction time TTC is relatively long (when the collision possibility is relatively small) will be explained.

The increasing rate ΔGup of the assist amount Greq is relatively smaller in the case where the collision prediction time TTC is relatively long, compared to the case where the collision prediction time TTC is relatively short. As a result, as illustrated by the dashed graph in FIG. 6, the assist amount Greq increases more gradually along with the start of the pre-crash brake assist control in the case where the collision prediction time TTC is relatively long, compared to the case where the collision prediction time TTC is relatively short. Namely, the vehicle speed V1 of the vehicle 1 does not decrease very rapidly. Therefore, there is really very litter or no case that the pre-crash brake assist control is performed excessively even when the collision prediction time TTC is relatively long (namely, the contact possibility is relatively low). In other words, there is really very litter or no case that the vehicle speed V1 of the vehicle 1 is excessively reduced by the pre-crash brake assist control against the driver's operation of the brake pedal 22 when the collision prediction time TTC is relatively long (namely, the contact possibility is relatively low). Thus, a responsiveness of the driver with respect to the operation of the brake pedal 22 improves.

In addition, the decreasing rate ΔGdw of the assist amount Greq is relatively larger in the case where the collision prediction time TTC is relatively long, compared to the case where the collision prediction time TTC is relatively short. As a result, as illustrated by the dashed graph in FIG. 6, the assist amount Greq decreases more rapidly in the case where the collision prediction time TTC is relatively long, compared to the case where the collision prediction time TTC is relatively short. Namely, the assist amount Greq caused by the pre-crash brake assist control can become zero at a relatively earlier timing in the case where the collision prediction time TTC is relatively long, compared to the case where the collision prediction time TTC is relatively short. In other words, an assist caused by the pre-crash brake assist control ends at a relatively earlier timing in the case where the collision prediction time TTC is relatively long, compared to the case where the collision prediction time TTC is relatively short. Namely, the timing when the pre-crash brake assist control ends is relatively earlier in the case where the collision prediction time TTC is relatively long, compared to the case where the collision prediction time TTC is relatively short. Therefore, there is really very litter or no case that the pre-crash brake assist control is performed excessively even when the collision prediction time TTC is relatively long (namely, the contact possibility is relatively low). In other words, there is really very litter or no case that the vehicle speed V1 of the vehicle 1 is excessively reduced by the pre-crash brake assist control against the driver's operation of the brake pedal 22 when the collision prediction time TTC is relatively long (namely, the contact possibility is relatively low). Thus, a responsiveness of the driver with respect to the operation of the brake pedal 22 improves.

As described above, the pre-crash brake assist control which achieves an appropriate assist amount Greq (namely, the deceleration) adapting to the collision prediction time TTC is performed.

Incidentally, in the above explanation, an example in which the assist amount Greq is calculated on the basis of the collision prediction time TTC is explained. However, the assist amount Greq may be calculated on the basis of an arbitrary parameter which directly or indirectly indicates the collision possibility, in addition to or instead on the collision prediction time TTC.

In addition, in the above explanation, an example in which both of the increasing rate ΔGup and the decreasing rate ΔGdw of the assist amount Greq are set is explained. However, the increasing rate ΔGup of the assist amount Greq may set on the basis of the collision prediction time TTC while the decreasing rate ΔGdw of the assist amount Greq may not set (namely, the decreasing rate ΔGdw of the assist amount Greq may be constant). Alternatively, the decreasing rate ΔGdw of the assist amount Greq may set on the basis of the collision prediction time TTC while the increasing rate ΔGup of the assist amount Greq may not set (namely, the increasing rate ΔGup of the assist amount Greq may be constant).

The present invention may be changed, if desired, without departing from the essence or spirit of the invention which can be read from the claims and the entire specification. A brake control apparatus, which involves such changes, is also intended to be within the technical scope of the present invention.

REFERENCE SIGNS LIST 1 vehicle
2 millimeter wave radar
18 vehicle speed sensor
22 brake pedal
23FL, 23FR, 23PL, 23RR actuator
100 ECU
110 collision determination ECU block
111 collision time calculating unit
112 driver operation amount detecting unit
113 PCBA determining unit 113
120 brake assist ECU block
121 assist amount calculating unit
122 assist controlling unit
TTC collision prediction time
Greq assist amount
ΔGup increasing rate
ΔGdw decreasing rate

The invention claimed is:

1. A brake control apparatus which performs a brake assist control for assisting a brake operation by a driver of a vehicle when an obstacle exists anterior to the vehicle, the brake control apparatus comprising:
  a controller configured to:
    calculate a contact possibility of the vehicle contacting the obstacle;
    change, on the basis of the contact possibility, a decreasing rate of a deceleration of the vehicle caused by the brake assist control, when the deceleration of the vehicle decreases as time passes regardless of the brake operation by the driver; and
    change the decreasing rate of the deceleration such that the higher the contact possibility is, the smaller the decreasing rate of the deceleration is.

2. The brake control apparatus according to claim 1, wherein the controller changes, on the basis of the contact possibility, the decreasing rate of the deceleration when the brake assist control is performed such that the deceleration decreases as time passes.

3. The brake control apparatus according to claim 1, wherein
the controller changes, on the basis of the contact possibility, an increasing rate of the deceleration when the brake assist control is performed such that the deceleration increases as time passes, and
the controller (i) changes the increasing rate of the deceleration such that the higher the contact possibility is, the larger the increasing rate of the deceleration is, if the contact possibility is equal to or more than a predetermined threshold value, and (ii) fixes the increasing rate of the deceleration, if the contact possibility is not equal to or more than the predetermined threshold value.

4. The brake control apparatus according to claim 1, wherein
the controller changes at least one of a decreasing rate of a first deceleration and the increasing rate of a second deceleration such that the higher the contact possibility is, the larger an absolute value of a difference between the decreasing rate of the first deceleration and the increasing rate of the second deceleration is,
the first deceleration is the deceleration when the brake assist control is performed such that the deceleration decreases as time passes, and
the second deceleration is the deceleration when the brake assist control is performed such that the deceleration increases as time passes.

5. The brake control apparatus according to claim 1, wherein the controller calculates, as the contact possibility, a collision prediction time until the vehicle collides with the obstacle.

6. The brake control apparatus according to claim 5, wherein the controller changes, on the basis of the collision prediction time, the decreasing rate of the deceleration when the brake assist control is performed such that the deceleration decreases as time passes.

7. The brake control apparatus according to claim 5, wherein the controller changes the decreasing rate of the deceleration such that the shorter the collision prediction time is, the smaller the decreasing rate of the deceleration is.

8. The brake control apparatus according to claim 5, wherein
the controller changes, on the basis of the collision prediction time, an increasing rate of the deceleration when the brake assist control is performed such that the deceleration increases as time passes, and
the controller (i) changes the increasing rate of the deceleration such that the shorter the collision prediction time is, the larger the increasing rate of the deceleration is, if the collision prediction time is equal to or less than a predetermined threshold value, and (ii) fixes the increasing rate of the deceleration, if the collision prediction time is not equal to or less than the predetermined threshold value.

9. The brake control apparatus according to claim 5, wherein
the controller changes at least one of a decreasing rate of a first deceleration and an increasing rate of a second deceleration such that the shorter the collision prediction time is, the larger an absolute value of a difference between the decreasing rate of the first deceleration and the increasing rate of the second deceleration is,
the first deceleration is the deceleration when the brake assist control is performed such that the deceleration decreases as time passes, and
the second deceleration is the deceleration when the brake assist control is performed such that the deceleration increases as time passes.

10. A brake control apparatus which performs a brake assist control for assisting a brake operation by a driver of a vehicle when an obstacle exists anterior to the vehicle, the brake control apparatus comprising:
a controller being configured to:
calculate a contact possibility of the vehicle contacting the obstacle; and
change at least one of a decreasing rate of a first deceleration and an increasing rate of a second deceleration such that the higher the contact possibility is, the larger an absolute value of a difference between the decreasing rate of the first deceleration and the increasing rate of the second deceleration, when the deceleration of the vehicle changes as time passes regardless of the brake operation by the driver, wherein
the first deceleration is a deceleration of the vehicle when the brake assist control is performed such that the deceleration decreases as time passes, the second deceleration is a deceleration when the brake assist control is performed such that the deceleration increases as time passes.

11. The brake control apparatus according to claim 10, wherein the controller changes the decreasing rate of the first deceleration such that the higher the contact possibility is, the smaller the decreasing rate of the first deceleration is.

12. The brake control apparatus according to claim 10, wherein the controller changes the increasing rate of the second deceleration such that the higher the contact possibility is, the larger the increasing rate of the second deceleration is.

13. The brake control apparatus according to claim 10, wherein the controller calculates, as the contact possibility, a reach time until the vehicle reaches the obstacle.

14. The brake control apparatus according to claim 13, wherein the controller changes the decreasing rate of the first deceleration such that the shorter the reach time is, the smaller the decreasing rate of the first deceleration is.

15. The brake control apparatus according to claim 13, wherein the controller changes the increasing rate of the second deceleration such that the shorter the reach time is, the larger the increasing rate of the second deceleration is.

* * * * *